Sept. 11, 1934.  E. FLAGG  1,973,617
COMPARTMENT VEHICLE
Filed May 13, 1932   2 Sheets-Sheet 1
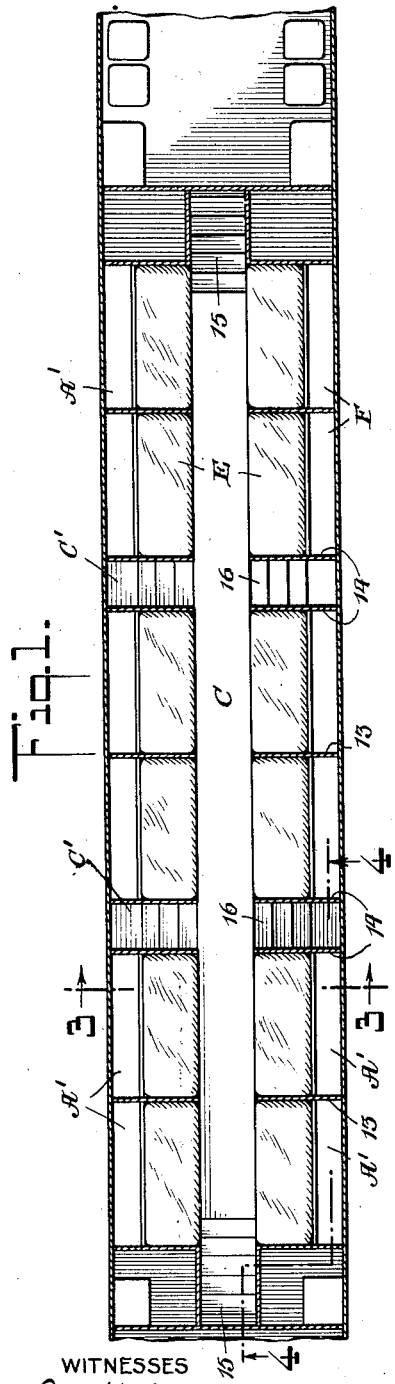
WITNESSES
INVENTOR
Ernest Flagg
BY
ATTORNEYS Sept. 11, 1934.  E. FLAGG  1,973,617
COMPARTMENT VEHICLE
Filed May 13, 1932  2 Sheets-Sheet 2
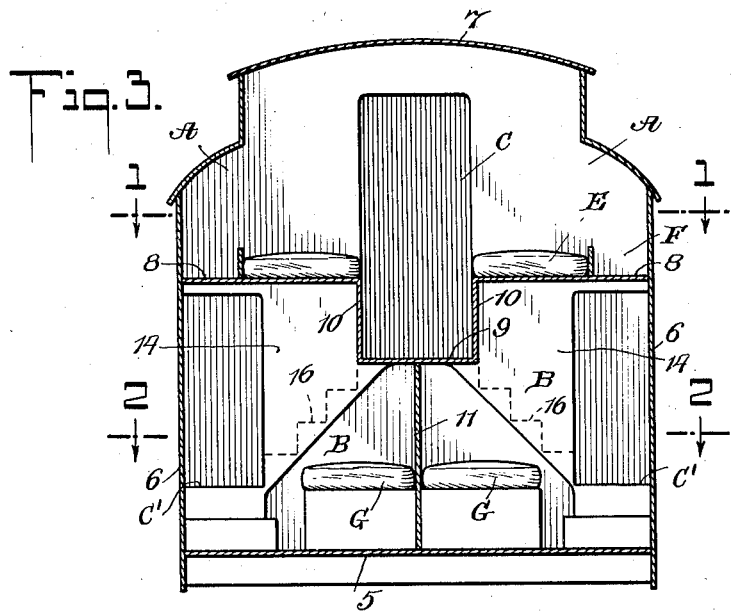
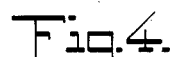
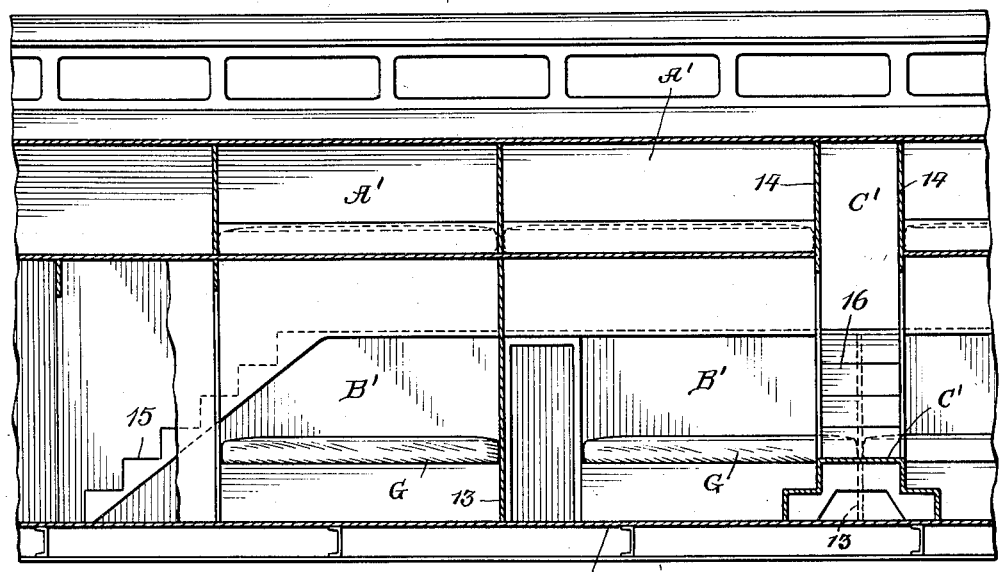
WITNESSES
INVENTOR
Ernest Flagg
BY Munn & Co.
ATTORNEYS Patented Sept. 11, 1934

1,973,617

UNITED STATES PATENT OFFICE 1,973,617

COMPARTMENT VEHICLE

Ernest Flagg, New York, N. Y.

Application May 13, 1932, Serial No. 611,216

10 Claims. (Cl. 105—315)

This invention has general reference to compartment vehicles, and finds its principal adaptation to sleeping cars, although not necessarily restricted to this field.

The invention aims to provide an improved vehicle of the class indicated, in which a more efficient arrangement of the berths is obtained, in which more spacious and uniform accommodations are afforded and in which greater privacy is insured to the occupants.

The invention further resides in a sleeping car or equivalent vehicle which overcomes to a great extent many of the disadvantages and objectionable features of this class of vehicles without unduly complicating the structure thereof or materially increasing the cost of production, while substantially improving upon those previously devised and now in use.

An outstanding feature of the present invention is the provision of a main corridor or passageway which is elevated above the floor of the car or vehicle and which detracts only partially from each of the transversely and vertically arranged compartments defined in the vehicle.

As a further feature, the invention comprehends in a sleeping car or analogous compartment vehicle, an elevated corridor by virtue of which two rows of lower rooms or compartments may be made to extend the full width of the car or vehicle body while access may be gained to the upper compartments or berths directly from the elevated corridor without the necessity of using ladders, the construction thereby making for greater use of space in a standard car body.

The invention further comprehends in conjunction with an elevated corridor as above specified, steps leading down to the intermediate lower berths, with means for gaining access directly from the floor level of the car to the endmost lower berths.

With the above recited and other objects in view, reference is had to the following description and accompanying drawings, in which there is exhibited one example or embodiment of the invention, while the claims define the actual scope of the same.

In the drawings:

Figure 1 is a fragmentary sectional plan view through a sleeping car constructed in accordance with the invention, the section being taken on a plane indicated approximately by the line 1—1 in Figure 3.

Figure 2 is a similar view taken on a plane indicated by the line 2—2 in Figure 3.

Figure 3 is an enlarged transverse sectional view taken approximately on the line indicated at 3—3 in Figure 1.

Figure 4 is an enlarged longitudinal vertical sectional view taken approximately on the line indicated at 4—4 in Figure 1.

Referring to the drawings by characters of reference, the present invention is illustrated as applied to a sleeping car, in which 5 designates the floor of the car body, 6 the opposite side walls and 7 the roof. The body is longitudinally divided vertically and horizontally by horizontal partitions 8—8 and 9 and by vertical partitions 10—10 and 11, to provide upper and lateral major divisions A—A and lower and lateral major divisions B—B and to further provide an elevated corridor C lying partially within each of said divisions. The main divisions are subdivided by transverse end partitions 12 and intermediate partitions 13 and 14 into subdivisions defining individual upper and lower compartments A' and B' and passages or sub-corridors C' leading downwardly from the corridor to the intermediate lower compartments, that is, all of the lower compartments with the exception of the endmost lower compartments, to which access is gained directly by doorways D. Ingress and egress to the main elevated corridor C is gained by stairways 15 at the opposite ends of the corridor, while ingress and egress to the intermediate lower berths B' is reached by stairways 16 in the sub-corridors or passageways C'. The arrangement of the berths and other fittings within the individual compartments A' and B' is discretionary, but for the purpose of illustration, the bunks or beds E in the upper individual compartments A' are disclosed on the horizontal partitions 8 immediately adjacent the vertical partitions 10 and adjacent the main corridor C, with spaces F between the bunks or beds E and the side walls 6 of the car body for the combination of baggage, clothing or the like. The bunks or beds G of the lower individual compartments or berths B' are disclosed as supported adjacent the vertical longitudinal partition 11 and the transverse partitions 13.

From the foregoing construction, it will thus be seen that a more efficient arrangement of the berths is obtained, while more spacious and uniform accommodations are afforded, to make for greater comfort to the occupants, inasmuch as all of the berths may be reached conveniently and without the necessity of using ladders.

While there has been illustrated and described a preferred embodiment of the invention by way of example, no limitation is intended to the precise structural details, as it is to be understood that variations and modifications thereof which fall within the range of the appended claims may be resorted to when desired.

What is claimed is:

1. A compartment vehicle including a body, permanent longitudinal partitions dividing the body vertically and horizontally to define upper and lower laterally disposed major divisions and a single permanently arranged centrally disposed elevated corridor lying partially within each of said divisions and transverse partitions subdividing the main divisions into subdivisions defining individual compartments and passageways leading downwardly from the corridor to the intermediate lower compartments.

2. A compartment vehicle including a body, permanent longitudinal partitions dividing the body vertically and horizontally to define upper and lower laterally disposed major divisions and a single permanently arranged centrally disposed elevated corridor lying partially within each of said divisions and transverse partitions subdividing the main divisions into subdivisions defining individual compartments and passageways leading downwardly from the corridor to the intermediate lower compartments, all of said upper compartments opening directly into said corridor.

3. A compartment vehicle including a body, permanent longitudinal partitions dividing the body vertically and horizontally to define upper and lower laterally disposed major divisions and a single permanently arranged centrally disposed elevated corridor lying partially within each of said divisions and transverse partitions subdividing the main divisions into subdivisions defining individual compartments and passageways leading downwardly from the corridor to the intermediate lower compartments, all of said upper compartments opening directly into said corridor and the endmost lower compartments opening into the ends of the car independently of the elevated corridor.

4. A compartment vehicle including a body, permanent longitudinally extending horizontal and vertical partitions dividing the body vertically and horizontally to define upper and lower laterally disposed major divisions and a single permanently arranged centrally disposed elevated corridor lying partially within each of said divisions and transverse partitions subdividing the main divisions into subdivisions defining individual compartments and passageways leading from the corridor to the intermediate lower compartments.

5. A compartment vehicle including a body, permanent longitudinally extending horizontal and vertical partitions dividing the body vertically and horizontally to define upper and lower laterally disposed major divisions and a single permanently arranged centrally disposed elevated corridor lying partially within each of said divisions and transverse partitions subdividing the main divisions into subdivisions defining individual compartments and passageways leading from the corridor to the intermediate lower compartments, steps leading downwardly from the corridor through said passageways to the intermediate lower compartments, steps leading upwardly to the elevated corridor at the opposite ends thereof and doors opening into the endmost lower compartments independently of the elevated passageway.

6. A compartment vehicle including a body having upper and lower transversely arranged compartments and a single permanently arranged centrally disposed elevated longitudinally extending corridor from which access is directly gained to the upper compartments and steps leading down to the intermediate lower compartments from said corridor.

7. A compartment vehicle including a body, and an arrangement of longitudinal vertical partitions, transverse vertical partitions and longitudinal horizontal partitions dividing said body into upper and lower compartments, a longitudinal passageway communicating with all of said upper compartments, and transverse passageways, each of which communicates with the longitudinal passageway, and each of which also communicates with a plurality of the lower compartments.

8. A compartment vehicle including a body, an arrangement of longitudinal vertical partitions, transverse vertical partitions and longitudinal horizontal partitions dividing said body into upper and lower compartments, a longitudinal passageway communicating with all of said upper compartments, and transverse passageways, each of which communicates with the longitudinal passageway, and each of which also communicates with a plurality of the lower compartments, and steps in each of said transverse passageways between the longitudinal passageway and the compartments communicating therewith.

9. A compartment vehicle including a body, and an arrangement of longitudinal vertical partitions, transverse vertical partitions and longitudinal horizontal partitions dividing said body into upper and lower compartments, a central longitudinal passageway communicating with all of said upper compartments, and transverse passageways at opposite sides of said longitudinal passageway, and each of which communicates with the longitudinal passageway, and each of which also communicates with a plurality of the lower compartments.

10. A compartment vehicle including a body, and an arrangement of longitudinal vertical partitions, transverse vertical partitions and longitudinal horizontal partitions dividing said body into upper and lower compartments disposed end to end, an upper central longitudinal passageway directly open to all of the upper compartments, and transverse passageways each of which communicates with said longitudinal passageway, and each of which also communicates with a plurality of the lower compartments at one side of the body.

ERNEST FLAGG.